S. BACHMANN.
BOX.
APPLICATION FILED NOV. 11, 1910.

1,157,285.

Patented Oct. 19, 1915.
5 SHEETS—SHEET 1.

Witnesses:
C. L. Taylord.
G. F. Chase.

Inventor:
Siegmund Bachmann,
By Dyrenforth, Lee, Chritton & Wiles,
Per William B. Davis Att'ys.

Witnesses:
Inventor:
Siegmund Bachmann

UNITED STATES PATENT OFFICE.

SIEGMUND BACHMANN, OF CHICAGO, ILLINOIS.

BOX.

1,157,285.  Specification of Letters Patent.  Patented Oct. 19, 1915.

Application filed November 11, 1910. Serial No. 591,749.

*To all whom it may concern:*

Be it known that I, SIEGMUND BACH-MANN, a citizen of the United States, residing at Chicago, in the county of Cook and State of Illinois, have invented a new and useful Improvement in Boxes, of which the following is a specification.

My invention relates to improvements in boxes more commonly formed of flexible box-board and involving a base, with surrounding walls extending upwardly therefrom and carrying corner-extensions connected with walls of the box and flaps on the latter overlying such extensions when the box is formed, the whole being so constructed as to permit of the collapsing of the box for storage purposes. Boxes of this type, where the flaps are secured to end-portions of the box, as hitherto constructed have presented the objection of collapsing when in use by the accidental withdrawing of the corner-extensions from engagement with the free overlapping ends of the flaps, owing to the manner of holding the flaps in place and the construction of the corner-extensions, which necessitated the placing of the fastening means for the flaps so far from the ends of the latter as to permit accidental disengagement of the extensions from these flaps when the box is in use.

A further objection incident to boxes as hitherto constructed is that of lack of desired bracing of opposed box-walls by the corner-extensions where the proportions of the box are such as to cause the diagonal folding lines of the extensions to overlap, as in the case of hat-boxes, such boxes necessitating the cutting away of the upper end-portions of the inner ends of the corner-extensions to permit the box to be collapsed. Furthermore, in boxes of the type in w'uich it is designed that the end flaps be held at all times in engagement with the end-portions of the box carrying them, the fastening means employed for this purpose held the flaps in a manner necessitating the flexing or the springing of the flaps in order that the corner-extensions be passed beneath them for holding such extensions in place. This is a disadvantage, in that the free ends of the flaps are caused to stand away from the inner sides of the box and thus present obstructions to the removal of the contents thereof, especially where such contents is an integral body of material which snugly fits the box.

My objects are to provide improvements in boxes of the collapsible type for overcoming the objections above pointed out and thereby provide against accidental collapsing of the box, to afford efficient bracing of walls of the box by the infolded corner-extension, to obviate flexing or springing of the ends of the flaps, and, generally, to so improve boxes of the collapsible type that they may be manufactured more cheaply and with the minimum amount of stock, and be rendered highly satisfactory for use.

Referring to the accompanying drawings

Each of the constructions of box selected for illustrating a different embodiment of my invention involves, generally stated, a rectangular base having four walls, or two sets of opposed walls, with corner-portions, or extensions, formed of inwardly-extending sections, one set of the walls being provided with inwardly-folding flaps adapted to overlap the corner-extensions and to be secured in a manner to hold the latter in place by engagement of these extensions with the free ends of the flaps.

Figure 5:
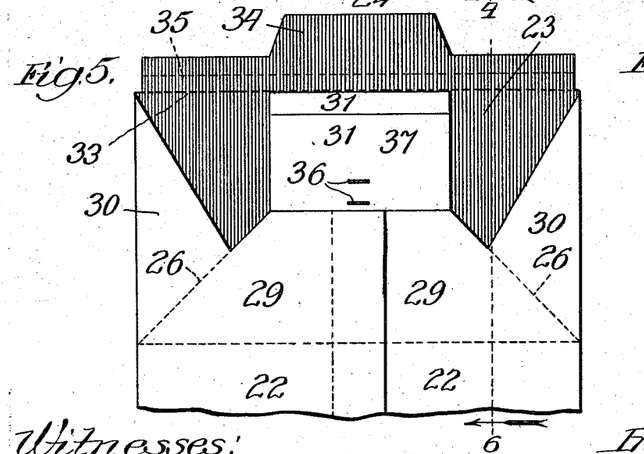
Fig. 5 is a plan view of the end of the box illustrated in the preceding figures, the box being shown in collapsed condition.
Figure 6:
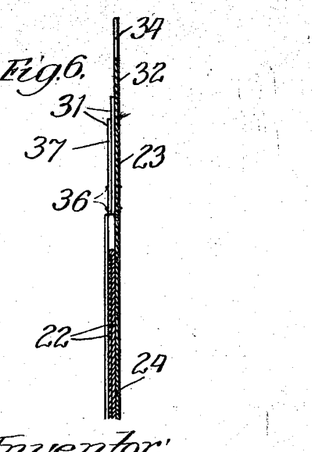
Fig. 6 is a section taken at the line 6 on Fig. 5 and viewed in the direction of the arrow.
Figure 7:
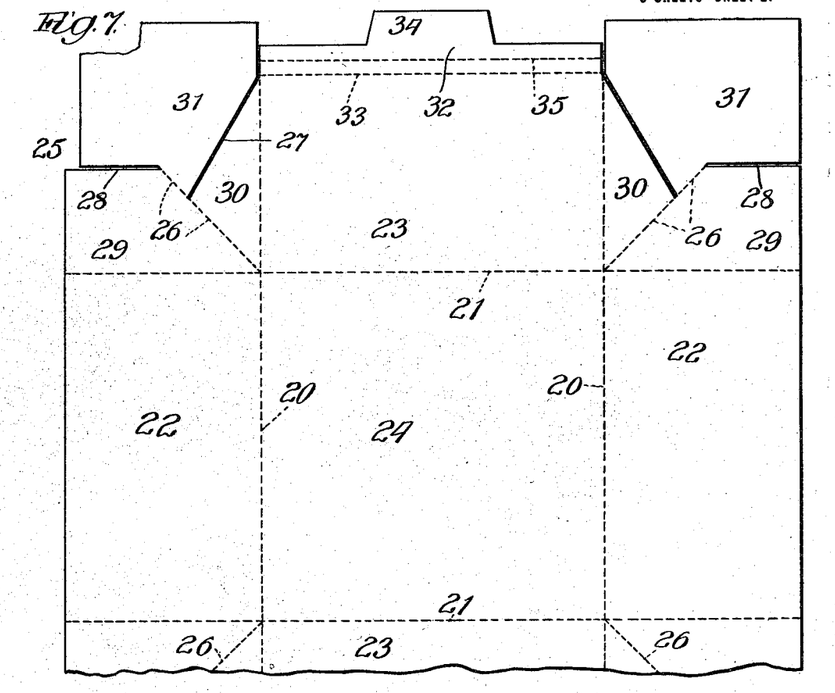
Fig. 7 is a broken view of the blank from which the box of the preceding figures is formed.

Referring particularly to Figs. 1 to 7 inclusive, which illustrate a box of what is known as the hat-box type, the blank from which the box is constructed is represented in Fig. 7 and consists of a rectangular sheet of box-board adapted to be folded along the parallel dotted lines 20 and 21 to form the box sides 22 and 23, respectively, hingedly connected with the base 24, the dotted lines being, by preference, creases to facilitate folding the parts. The lines 20 intersect the lines 21 to form the four corner-portions, or extensions, 25 of the blank, which are hingedly connected with the ends of the walls 22 and 23 through the medium of those portions of the lines 20 and 21 which extend beyond their intersection with each other as represented in Fig. 7. Each corner-extension 25 contains a diagonal folding line 26, and is slit along an irregular line 27 leading from the outer edge of the blank to the folding line 26, and along the line 28 extending from the lateral edge of the extension to the diagonal folding line 26, whereby each extension 25 is formed into three sections 29, 30 and 31. On each wall 23 is an extension, or flap, 32 of a length approximately equal to the length of the wall carrying it, these flaps being foldable inwardly toward the walls 23 along dotted folding lines 33, beyond which lines the sections 31 extend as represented in Fig. 7. Each flap 32 is preferably formed with a centrally-disposed tongue 34 on its outer edge and with a folding line 35 parallel with the line 33, for a purpose hereinafter disclosed.

The box may be formed from the blank described by turning the walls 22 and 23 to upright position, in which they extend at right-angles to the base 24, the sections 29, 30 and 31 of each corner-extension 25, in this operation, folding inwardly along that portion of the diagonal line 26 which extends from its intersection with the line 27 to the adjacent intersection of the lines 20 and 21, and along the extremities of the lines 20 and 21 to a position in which the sections 29 and 30 lie flatwise, with their outer faces together, against the walls 23, and the sections 31, carried by the sections 29, extend parallel with the walls 23, as illustrated in Figs. 1 to 4 inclusive. The sections 31 thus folded overlap each other at the central portion of the box as represented in the figures last referred to, in which condition they are secured in place in any suitable manner, as for example by staples 36 passing through them and the adjacent wall 23. The section 31 which is in contact with the wall 23 reaches preferably from the top to the bottom of this wall, whereas, by preference, the other, overlapping, section 31 falls short of the top of this wall to form an upwardly extending tongue 37. After the walls have been erected as described, the flaps 32 may be folded inwardly and downwardly to overlie at their free ends the top edge-portions of the sections 29, the tongues 34 of the flaps in this operation being introduced under the tongues 37, the use of tongues 34 on the flaps 32 being preferred as they facilitate the introduction of these flaps under the tongues 37 and operate in conjunction with the latter to prevent disengagement of the free ends of the flaps from the corner-extensions 25 when the box is set up.

Figures 1, 2, 3, 4:
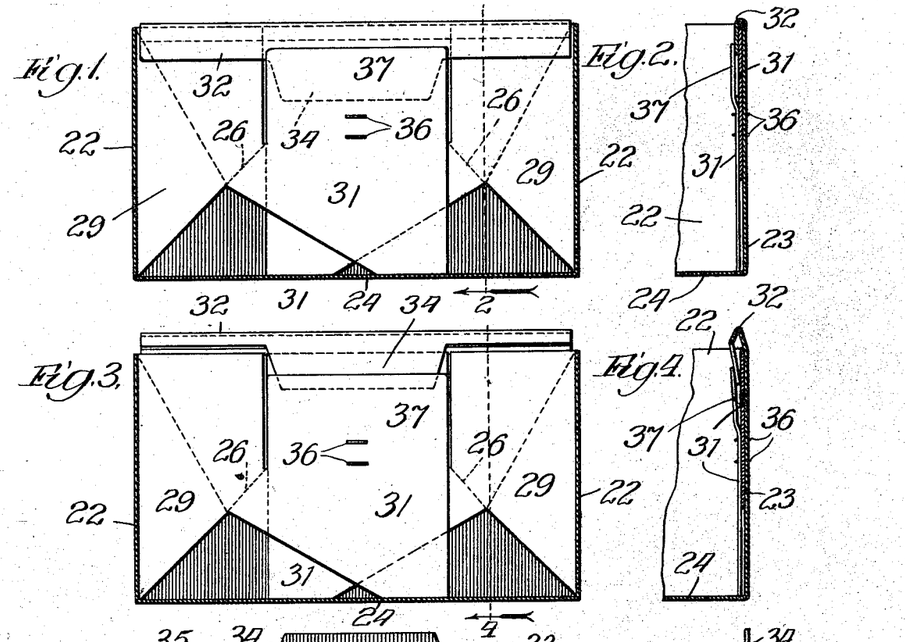
Figure 1 is a section taken transversely through a box of the uncut-corner type constructed in accordance with my invention this view showing the base and side walls of the box in section and the inner side of one of the two similar end-portions of the box in elevation, the box in this figure being shown in set-up condition for use.
Fig. 2 is a broken section taken on the line 2 of Fig. 1 and viewed in the direction of the arrow.
Fig. 3 is a view like that of Fig. 1 showing the end-flap therein illustrated raised sufficiently to permit of the collapsing of the walls of the box without flexing the ends of the flaps.
Fig. 4 is a broken section taken at the line 4 on Fig. 3 and viewed in the direction of the arrow.

When it is desired that the box be collapsed or reduced to "knockdown" condition, the flaps 32 are buckled upwardly along their folding lines 33 and 35 sufficiently far to carry their free ends above the plane in which the upper edges of the sections 29 extends, as illustrated in Figs. 3 and 4, whereupon the walls 23 are then swung down and outwardly along the folding lines 21, and the walls 22 are swung downwardly and inwardly along the lines 20 to the position illustrated in Fig. 5, the sections 29 in this operation folding downwardly and inwardly upon the lines 26 and the outer extremities of the lines 21 to the overlapping position represented in Fig. 5. In operating the flaps 32 as described, the tongues 34 move upon the tongues 37 but do not become disengaged therefrom during the collapsing of the box-walls, and thus after such collapsing is effected the flaps may be flattened out against the end-portions of the box carrying them by merely pressing them down with the hand, the tongues 34 in this movement moving inwardly under the tongues 37 to a position in which they extend into full engagement therewith as illustrated in Fig. 1, whereby the flaps are held flat as illustrated in Fig. 6.

The box is righted from the position illustrated in Fig. 5 to that illustrated in Fig. 1 by swinging the walls 23 upwardly and inwardly, and the walls 22 upwardly and outwardly upon the base 24, the sections 29 in this operation turning at their hinged connections with the walls 22 and sections 30 and 31 and folding to the position illustrated in Fig. 1. During the operation of swinging the walls as described, the operator buckles the flaps 32 to the position illustrated in Figs. 3 and 4 for moving their end-portions out of the path of movement of the upper edges of the sections 29, whereby the latter may be folded into the position illustrated in Fig. 1 without flexing, or springing the ends of the flaps. Owing to the engagement of the tongues 37 with the flaps as described, the latter need not be fully withdrawn from engagement with the tongues 37 during the operation of righting the box as described, and thus just as soon as the box is righted, the flaps 32 may be moved to position for holding the extensions 25 in place, as illustrated in Fig. 1, by merely pressing flatwise against the flaps to flatten them out. It will be understood from the foregoing description that in the particular box described, the sections 29 are the only portions of the corner-extensions 25 which fold when the box is collapsed, and righted from collapsed condition, the sections 30 and 31 being permanently held in place against the walls 23.

Figure 8:
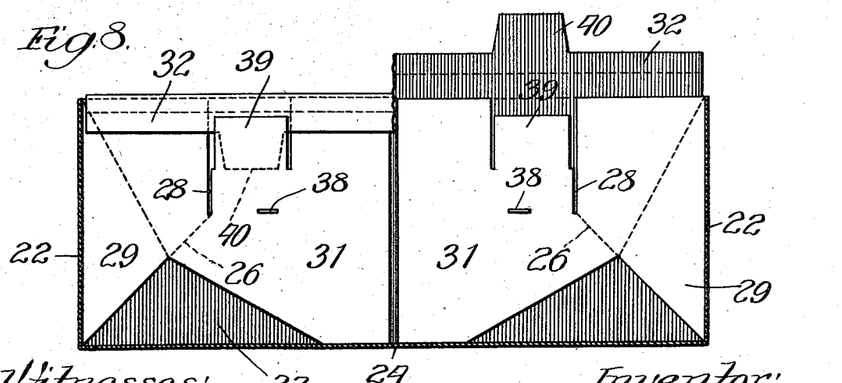
Fig. 8 is a view like that of Fig. 1 of a box of the same general characteristics as the one therein disclosed, excepting that its proportions are such that its corner-extensions reach short of each other and thus do not overlap as in Fig. 1, the integral flap of this construction being broken away between its ends, one end of the flap being shown in the position it assumes when holding the corner-extension in place and the other end thereof being folded outwardly, the better to disclose details of construction.

The construction illustrated in Fig. 8 is the same as that shown in the preceding figures, excepting that, owing to the proportions of the box, the sections 31 of the corner-extensions do not overlap, but reach short of each other as illustrated, and each section 31, which is separately secured to the wall against which it lies, as by staples 38, carries an upwardly extending tongue 39 which lies closely adjacent to the line 28 along which the extension is cut, the tongues 39 being adapted to engage with registering tongues 40 on the adjacent flap 32 as described of the engagement of the tongues 34 with the tongues 37 of the construction illustrated in the preceding figures. The operation of righting and collapsing the box is the same as that described of the construction shown in Figs. 1 to 7 inclusive, the flaps 32, in these operations, moving with relation to the walls carrying them as described of the flaps 32 in Figs. 1 to 6 inclusive, without becoming disengaged during these operations from the tongues 39.

Figure 9:
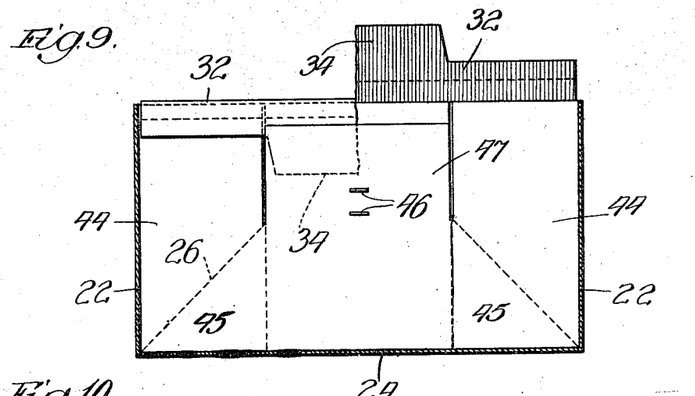
Fig. 9 is a view like that of Fig. 1 of a box of the cut-corner type constructed in accordance with my invention, the end flap thereof being broken between its ends and positioned as described of the flap of the construction illustrated in Fig. 8.
Figure 10:
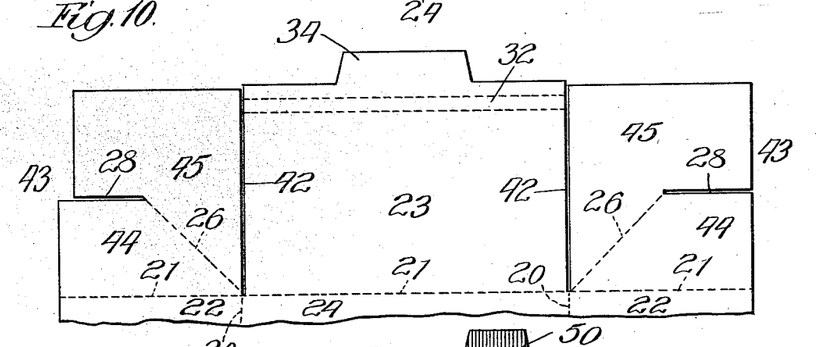
Fig. 10 is a view of one of the two similar end-portions of the blank from which the box of Fig. 9 is constructed.

Referring to Figs. 9 and 10, in which my invention is illustrated as embodied in a box of the cut-corner type, the blank, one of the two similar ends of which only is shown, from which the box is formed, is represented in Fig. 10, and is of the same construction as the blank shown in Fig. 7, excepting that the slits 27 are omitted and the lines 20 beyond their intersections with the lines 21 are slit as represented at 42 instead of forming folding lines. Thus, the corner-extensions of this box represented at 43, two only of the four similar ones of which are illustrated, are formed of but two sections 44 and 45, instead of three, the sections 45 being severed from the ends of the walls 23 and hingedly connected with the sections 44 along the lines 26. To form the box, one of the two similar ends of which are shown in Fig. 9, from the blank of Fig. 10, the walls 22 and 23 are turned upwardly at their hinged connections with the base 24 to a position in which they extend at right-angles to the base, the corner-extensions 43 being turned inwardly by the operator upon the extremities of the lines 21 to a position in which they will lie against the inner surfaces of the walls 23, the free ends of the sections 45 being thus carried to a position in which they overlap each other, in which position they are secured to the walls 23 as by staples 46, as represented in Fig. 9, or otherwise suitably secured. The section 45 at the left-hand side of Fig. 10 overlaps the section 45 at the opposite side thereof and is preferably of slightly less height than that of the wall against which it lies, as represented in Figs. 9 and 10, whereby an upwardly-extending tongue 47 is afforded as described of the construction shown in Figs. 1 to 7 inclusive, for engaging with the flap 32, formed on the walls 23 and constructed like the flaps of the last referred-to figures, the flaps 32 coöperating with the tongues 47 as described of the flaps 32 in the construction illustrated in Figs. 1 to 7 inclusive. The collapsing and righting of the box is effected in the same manner as that described of the construction illustrated in Figs. 1 to 6 inclusive, the sections 44 swinging at the lines 26 and their hinged connections with the walls 22, and the flaps 32 operating to permit the upper edges of the sections 44 to be swung into and out of position against the walls 23 without requiring flexing of the ends of the flaps 32 and the disengagement of the latter with the tongues 47.

Figure 11:
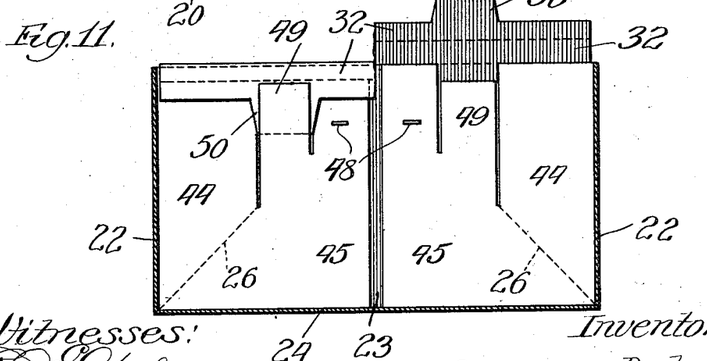
Fig. 11 is a view like that of Fig. 9 of a box having the characteristics of the box shown in the last referred-to figure, differing therefrom in slight details owing to a difference in the proportions of parts.

In Fig. 11 I have illustrated a box which is the same as that of Fig. 9, except that its sections 45 do not overlap each other, and each section 45 which extends in this case from the top to the bottom of the wall against which it lies, is separately secured thereto as by staples 48, each section 45 of the box shown in Fig. 11 further differing from those of Fig. 9 in that each is provided with an upwardly-extending tongue 49, these tongues engaging with registering tongues 50 on the flap. The operation of erecting and collapsing the box of Fig. 11 is the same as that described of the construction represented in Figs. 9 and 10, the flaps 32 of Fig. 11 moving with relation to the walls 23 carrying them as described of the flaps in Figs. 9 and 10 without disengaging from the tongues 49.

Figure 12:
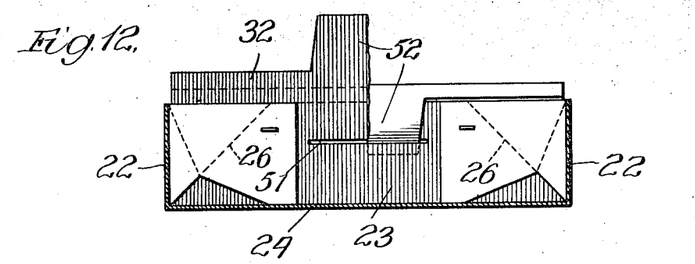
Fig. 12 is a view like that of Fig. 9 of still another embodiment of my invention illustrating a modification of the means for holding the flap in place, the latter being shown broken through the center with the left-hand end turned upwardly and the right-hand end thereof in a position in which the corner-extension cooperating therewith is free to be withdrawn.
Figure 13:
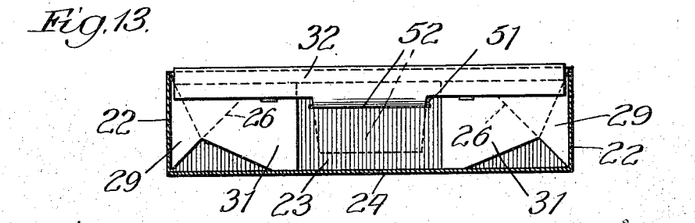
Fig. 13 is a view like that of Fig. 12 showing the flap in position for holding the corner-extensions in place.

The construction shown in Figs. 12 and 13 is illustrative of another form of embodiment of that feature of my invention which relates to the connection of the flaps 32 at their free edges with the walls carrying them. The box illustrated in these figures is of the same construction as that shown in Fig. 8, excepting that the tongues 39 and 40 on the sections 29 and flaps 32, respectively, and the slits 28 are omitted, and the walls 23 of the box contain longitudinally-extending slots 51 through which centrally-disposed tongues 52 on the flaps 32 extend, the tongues 52 being of sufficient length to permit the flaps 32 to be swung out of the path of movement of the movable sections of the corner-extensions to permit the latter to swing on the outer extremities of the lines 21 and the lines 26, which latter in this case extend to the upper edges of the extensions as represented in Fig. 12, away from the walls 23 upon the act of collapsing the box, without being withdrawn from the slots 51 as illustrated of that portion of the flap 32 which is at the right-hand end of Fig. 12, and as described of the flaps of the construction illustrated in Figs. 1 to 7 inclusive.

Figure 14:
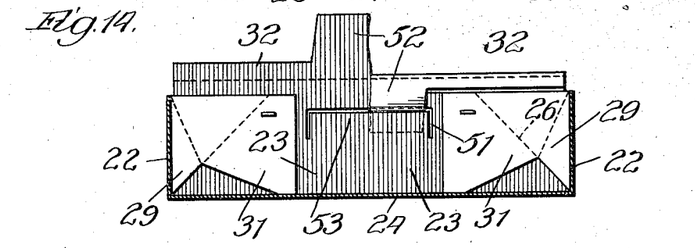
Fig. 14 is a view like that of Fig. 12 of still another embodiment of my invention.
Figure 15:
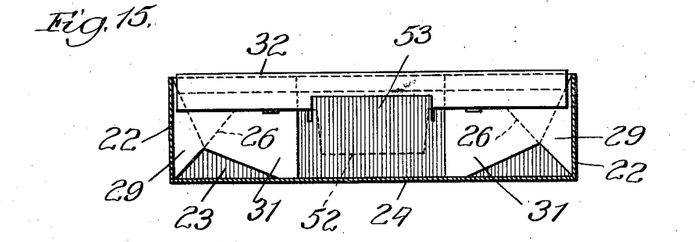
Fig. 15 is a view like that of Fig. 13 of the box illustrated in Fig. 14.

The construction of box illustrated in Figs. 14 and 15 is the same as that shown in Figs. 12 and 13, excepting in the particular that upwardly-extending tongues 53 are provided on the walls 23, instead of mere slots, these tongues engaging with the tongues 52 on the flaps 32. The parts of the box are so constructed, as illustrated, as to permit it to be collapsed and erected from collapsed condition without entirely disengaging the flaps 32 from the walls 23 as described of the construction illustrated in Figs. 12 and 13. Where the boxes are to be manufactured on a commercial scale, it is preferred that the blanks be folded directly into collapsed-box condition, instead of first erecting the box and then collapsing it, in which case the manner of thus manipulating the box is as follows: Referring to the box shown in Figs. 1 to 7 inclusive, the operation would be that of folding the walls 22 inwardly to cause them to overlap and lie against the base 24. Prior to thus positioning the walls 22 the sections 31 of the corner-extension 25 will be turned inwardly along the outer extremities of lines 26 to cause them to lie at their inner faces against the inner faces of the sections 29, with the result of causing the sections 31 to overlap each other and lie against the walls 23 when the walls 22 are folded against the base 24, as described. When the parts have been folded as described, the upper ends of the sections 29 may be secured in position against the walls 23 by the staples 36, or any other suitable fastening means, all as clearly illustrated in Fig. 5. After the walls 22 and extension 25 have been folded as described, the tongues 34 of the flaps 32 will be inserted beneath the tongues 37 as illustrated in the last referred to figure. The box of Fig. 8 may likewise be formed directly into collapsed-box condition from the blank from which it is formed, the tongues 40 being inserted beneath the tongues 39 when the walls 22 and corner-extensions have been folded into collapsed condition, it being understood that in the case of the box shown in Fig. 8, the walls 22 and sections 29 will not overlap each other, but will lie flatwise against the base 24 and the walls 23 when in collapsed condition, in which position the sections 29 may be secured to the walls 23 as by the staples 28, or any other suitable fastening means. The box of Fig. 9 may be formed into collapsed-box condition directly from the blank of Fig. 10, by turning the walls 22 inwardly and downwardly against the base 24 to cause them to overlap each other, the section 45 during this operation being manually turned upon the lines 26 to cause their inner faces to lie against the inner faces of the sections 44 and the outer faces of the sections 45 to lie against the walls 23, the sections 45 overlapping each other as explained of the construction illustrated in Fig. 5. When the parts have been folded as described, the staples 48 may be applied for the purpose hereinbefore described. After the operations just described, the flaps 32 may be inserted under the tongues 49 to cause them to lie flatwise against the walls 23. The boxes of Figs. 12 to 15 may likewise be formed directly into collapsed-box condition from the blanks from which they are constructed by folding the walls 22 and corner-extension as described of the construction illustrated in Fig. 8, whereupon the means for fastening the sections 31 of these box constructions to the walls 23 may be applied. The flaps 32 will be introduced at their tongues 52 into the slots 51 and under the tongues 53, respectively, after the walls 22 and corner-extension have been folded as described.

Figure 16:
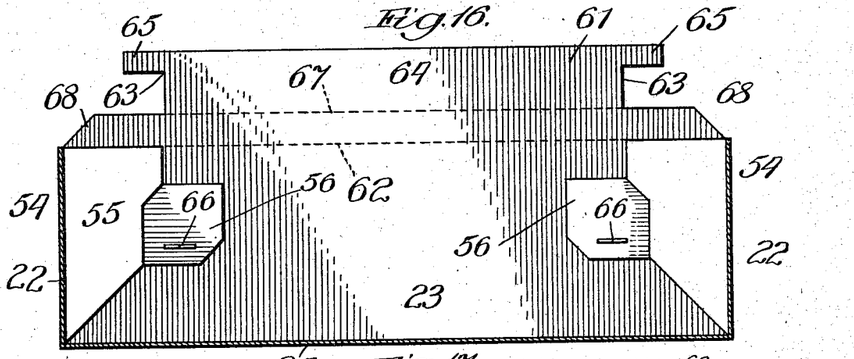
Fig. 16 is a view like Fig. 1 of another embodiment of my invention, the corner-engaging flaps being shown disconnected therefrom and in raised position.
Figure 17:
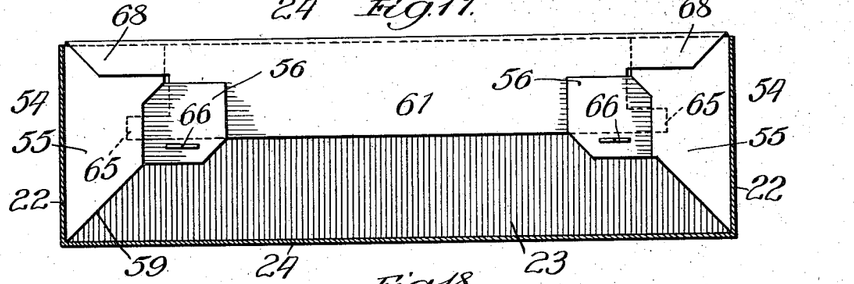
Fig. 17 is a view like Fig. 16 of the box therein illustrated showing the box in erected and secured condition.
Figure 18:
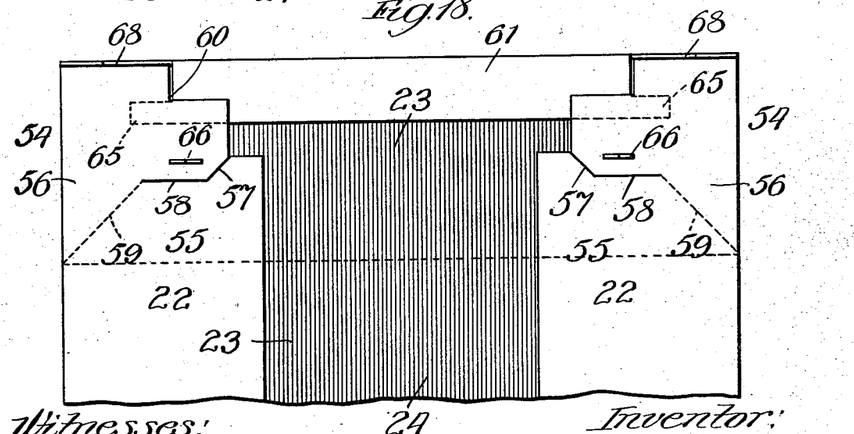
Fig. 18, a plan view of the box of Fig. 16 in collapsed condition.

In the box illustrated in Figs. 16, 17 and 18, which presents a very desirable embodiment of my invention, especially for suit-boxes, the corner-portions represented at 54 are each formed of two members 55 and 56 hinged at edges thereof to ends of the adjacent box-walls 22 and 23. The members 55 and 56 of each pair are partially severed from each other along lines 57 and 58 and are hinged together along the diagonal lines 59, the latter intersecting the ends of the slits 58. The upper ends of the members 56, when viewed in the position illustrated in Fig. 17, have their inner corners partially cut away as represented at 60 for a purpose hereinafter explained. The end-walls 23 of the box are provided with flaps 61 hinged thereto along folding lines 62, these flaps being preferably cut away at their ends as indicated at 63, whereby sections 64 of reduced length terminating at their outer ends in tongues 65, are formed. The sections 56 are preferably secured to the end-walls 23 against which they lie, as by staples 66, and the flaps 62 which have longitudinally-extending folding lines 67, lie at the ends of their sections 64 beneath the sections 56 as represented. The box is preferably formed by first bending the flaps 61 inwardly and downwardly on the folding lines 62 to cause them to lie flatwise against the walls 23, and the side-walls 22 and corner-extensions 54 folded inwardly and downwardly flatwise against the base 24 of the box and end-walls 23, respectively, to the position illustrated in Fig. 18, and the fasteners 66 then inserted. Thus folding the blank causes the ends of the flap-sections 64 to lie beneath the corner-sections 56 and the ends 68 of the flaps 61 to overlie the corner-sections 56. To erect the box from collapsed condition, the operator swings the walls 22 outwardly and upwardly and the walls 23 upwardly and inwardly, the corner-sections 55 swinging upon their coöperating respective corner-sections 56 at their hinged connections therewith, to the position illustrated in Figs. 16 and 17. Simultaneously with the raising of the walls of the box to upright condition, the operator buckles the flaps 61 upwardly along their folding lines 62 and 67 to cause the ends 68 of the flaps to be withdrawn from the path of movement of the sections 55 in swinging to upright position in which they lie flatwise against the respective sections 56. After the sections 55 have been swung to the position described and the box has become erected, the operator straightens out the flaps 61 in a manner hereinbefore described of the other constructions illustrated, thus causing the ends 68 of the flaps to be carried down to a position in which they overlap the upper edges of the sections 55, as illustrated in Fig. 17, for holding the corner-extensions in place. When it is desired to collapse the box, the operator will first upwardly buckle the flaps 61 as just described, to carry the ends 68 of the flaps to a position in which they will be out of the path of movement of the upper edges of the sections 55, whereupon the end walls 23 are swung outwardly and downwardly upon their hinged connections with the base 24, and the walls 22 are swung upwardly and downwardly upon their hinged connections with the base 24, the sections 55 in this operation swinging upon the sections 56 at their hinged connections therewith to the position illustrated in Fig. 18. As soon as the box has been collapsed as described, the operator straightens out the flaps 61 so that they lie flatwise against the walls 23, with their ends 68 overlapping the sections 56. It will be noted that the flaps 61 are manipulated as described to permit the box to be erected and collapsed without disengaging these flaps at their free portions from the ends of the box carrying them, and thus the operation of releasing the corner-extensions and locking them in place may be quickly and easily accomplished. The sections 56 are cut away as indicated at 60 to permit the flaps 61 to be readily buckled and straightened out by the operator while in engagement with the sections 56 for permitting of the collapsing and the erecting of the box.

It will be noted that in each of the constructions illustrated in Figs. 1 to 11 inclusive, the corner-extensions of the box contain slits 28 which extend from the upper edges of these extensions, considering them in the position they occupy when the box is set up, to the diagonal folding line 26, the position of these slits, which may be varied as desired, determining the width of that section of each corner-extension which folds when the box is collapsed and set up from collapsed condition, namely the sections 29 and 44 of the corner-extensions 25 and 43 respectively; and thus the lines upon which the sections 29 and 44 fold do not reach to the upper edge of the extensions. The advantages of thus slitting the extensions is that of permitting the flaps 32 to be secured in position on the walls carrying them sufficiently close to the ends of these walls as to prevent the accidental collapsing of the box in use by the movable parts of the extensions, namely the sections 29 and 44 overlapped by these flaps, withdrawing from engagement with the latter. Furthermore, the provision of the slits 28 permits of the formation of a box having walls of such height, with relation to their length, as would cause the diagonal folding lines of the extensions if extended to the upper edges of the latter to intersect each other, without necessitating the cutting off of the upper edge-portions of those portions of the corner-extensions which lie against the walls 23, whereby these walls of the box are provided with braces which extend from their upper to their lower edges at the central portions of the latter and serve to very effectually brace and strengthen the box-walls against buckling. The feature of slitting the extensions from their upper edges to their diagonal folding lines 26 may be incorporated in a box regardless of the manner in which the flaps 32 are held in place; namely, whether they be permanently secured between their ends to the end-portions of the box, thus necessitating the springing upwardly of the spring ends of the flaps when it is desired that the box be collapsed; whether the flaps be secured in accordance with my present herein described invention; or whether such flaps are secured in place, as by removable fastening means, after each box-righting operation.

One of the advantages of so constructing the box as to permit of the moving of the flaps 32 and 61 to a position in which their free ends will be carried out of the path of movement of those sections of the corner-extensions which fold when the box is collapsed and righted from collapsed condition, without disengaging entirely from the end-portion of the box on which they are supported, is that of avoiding the necessity of flexing or springing the free ends of the flaps, and thus when the latter lie in a position in which they overlap the corner-extensions, namely when the box is set up, they will lie flatwise against the inner surface of the end-portions of the box as illustrated in Fig. 2, instead of being swung away therefrom at their lower ends, thus permitting of the easy removal of the box contents regardless of their shape or size and the degree of snugness with which they fit the box. A further advantage arising from this feature of construction is that of permitting of the provision of any desired depth of extension-engaging flap for insuring against the accidental withdrawal of the extension from engagement with these flaps regardless of the kind of corner-extension employed. The feature of the box just referred to affords a still further advantage, where employed in connection with a box the corner-extensions of which are slit from their upper edges of their diagonal folding lines 26 as described, in that the means on the box for engaging with the corner-engaging flaps, whether such means be tongues or walls of openings, or any other means affording slip-joints for the flaps, may be located sufficiently close to the inner edges of the movable sections of the extensions, namely those edges which coincide with the slits 28, as to effectually prevent accidental withdrawal of the movable sections of the corner-extensions from the flaps coöperating therewith when the box is in righted condition, and still retain in the box the feature of constant engagement of the flaps with the end-portions of the box. It will also be noted that after the flaps 32 have been inserted into engagement with the coöperating tongues or slits, as the case may be, carried by the adjacent end-portions of the box, the removal of such flaps from engagement therewith is unnecessary, and thus the box is rendered automatically operative, the flaps freely sliding upon the end-portions of the box carrying them without disengaging therefrom, whereby the only operations required upon the flaps during the collapsing and righting of the box are those of buckling the flaps and pressing them flat respectively. The lines indicating the positions of the slits 28 are shown double for clearness of illustration, though it will be understood that these lines of severance may be either slits or slots, as desired.

While I have illustrated and described the feature of slitting the corner-extensions from their upper edges to their diagonal folding lines 26 in connection with the feature of providing for the movement of the corner-engaging flaps with relation to the end-portions of the box carrying them without disengaging therefrom, I do not wish to be understood as intending to limit my invention to constructions in which both of these features are present, as these features may be separately incorporated in boxes and still be within the spirit of my invention.

It will be understood that the folding lines in the flaps of Figs. 1 to 15 inclusive instead of extending the full length of the flaps, may extend short thereof, and in this respect be constructed like the flap of Fig. 16, and likewise the flaps 61 may be constructed like the flaps of the preceding figures without departing from the spirit of my invention.

What I claim as new, and desire to secure by Letters Patent, is—

1. A collapsible box formed of a base, walls extending therefrom, and corner extensions connected with walls of the box and lying against adjacent box-walls, said extensions lying at their extremities against adjacent walls of the box and being of a height substantially equal to the heights of the walls against which they lie to form braces therefor, said extensions containing diagonal folding lines and being slit along lines extending at an angle to said base from their upper edges to said diagonal folding lines.

2. A collapsible box formed of a base, walls extending therefrom, and corner extensions connected with walls of the box and lying against adjacent box-walls, the extremities of said extensions lying in mutually overlapping condition against adjacent box-walls and being of a height substantially equal to the heights of the walls against which they lie to form braces therefor, said extensions containing diagonal folding lines and being slit along lines extending at an angle to said base from their upper edges to said diagonal folding lines, for the purpose set forth.

3. A collapsible box formed of a base, walls extending upwardly therefrom, corner-extensions connected with walls of the box and lying against adjacent box-walls, said extensions being foldable along diagonal folding lines and each partially severed from its upper edge to its diagonal folding line, and flaps on the walls of the box against which said extensions lie engaging with the box at their free edges intermediate said lines of partial severance and overlapping at their ends said extensions.

4. A collapsible box formed of a base, walls extending upwardly therefrom, corner-extensions on walls of the box foldable along diagonal folding lines and formed of sections certain of which are connected with the other portions of the box merely along said folding lines, said last referred to sections being turned back and lying against adjacent box-walls to which they are secured, each of said extensions being slit along lines extending at an angle to said base from its upper edge to its diagonal folding line, and means on the box-walls engaging with the movable portions of said extensions for holding the box in set-up condition.

5. A collapsible box formed of a base, walls extending upwardly therefrom, corner-extensions lying between adjacent ends of the box-walls and hingedly connected therewith, said extensions being foldable along diagonal folding lines and each partially severed from edges thereof to its diagonal folding line from opposite sides thereof to afford in each extension two sections hingedly connected together and both connected with the box-walls, and a third section hinged to one of said two sections, said third sections lying against adjacent box-walls, and means on the box-walls engaging with the movable portions of said extensions for holding the box in set-up condition.

6. A collapsible box formed of a base, walls extending upwardly therefrom, corner-extensions lying between adjacent ends of the box-walls and hingedly connected therewith, said extensions being foldable along diagonal folding lines and each partially severed from edges thereof to its diagonal folding line from opposite sides thereof to afford in each extension two sections hingedly connected together and both connected with the box-walls, and a third section hinged to one of said two sections, adjacent third sections overlapping each other and lying against adjacent walls of the box, and means on the box-walls engaging with the movable portions of said extensions for holding the box in set-up condition.

7. A collapsible box formed of a base, walls extending therefrom, corner-extensions connected with walls of the box to lie against adjacent box-walls and foldable along their diagonal folding lines, flaps on walls of the box overlying at their ends said extensions, and means for holding the free portions of the flaps to the box, operating to permit the flaps to be bodily moved upwardly out of the way of the upper edges of the corner-extensions during the erecting and collapsing of the box without springing the end-portions of the flaps and without disengaging the flaps at their free edge-portions from the box.

8. A collapsible box formed of a base, walls extending therefrom, corner extensions connected with walls of the box to lie against adjacent box-walls and foldable along diagonal folding lines, and flaps on walls of the box overlying at their ends said extensions and provided with depending portions which extend below those portions of the flaps overlying the extensions and slidingly engage with the box, and operating to permit the flaps to be bodily moved upwardly out of the way of the upper edges of the corner-extensions during the erecting and collapsing of the box without springing the extension-overlapping ends of the flaps and without disengaging at their depending portions from the box.

9. A collapsible box formed of a base, walls extending therefrom, corner-extensions connected with walls of the box to lie against adjacent box-walls and foldable along diagonal folding lines, and flaps on walls of the box overlying at their ends said extensions and provided with depending sections which extend below those portions of the flaps overlying the extensions and slidingly engage with the box, said flaps being provided with longitudinally-extending bending lines, and operating to permit the flaps to be bodily moved upwardly out of the way of the upper edges of said corner-extensions during the erecting and collapsing of the box without springing the extension-overlapping ends of the box and without disengaging at their depending portions from the box.

10. A collapsible box formed of a base, walls extending therefrom, corner-extensions connected with walls of the box and lying against adjacent box-walls, said extensions being foldable along diagonal folding lines and each partially severed from its upper edge to its diagonal folding line, and flaps on walls of the box overlying at their ends said extensions and means for holding the flaps at their free portions to the box closely adjacent to said lines of partial severance, operating to permit the flaps to be bodily moved upwardly out of the way of the upper edges of the corner-extensions during the erecting and collapsing of the box without springing the end-portions of the flaps and without disengaging at their free edge-portions from the box.

11. A collapsible box formed of a base, walls extending therefrom, corner-extensions connected with walls of the box to lie against adjacent box-walls and folding along diagonal folding lines, flaps on walls of the box overlying at their ends said extensions and provided with depending portions which extend below those portions of the flaps which overlie the extensions, and tongues on said box engaging with said depending sections, said tongues being constructed and arranged to permit the flaps to be bodily moved out of the way of the upper edges of the corner-extensions during the erecting and collapsing of the box, without springing the extension-overlapping ends of the flaps and without disengaging at their depending sections from said tongues.

12. A collapsible box formed of a base, walls extending therefrom, corner-extensions connected with walls of the box and lying against adjacent box-walls at which the extremities of the extensions are secured, said extensions being foldable along diagonal folding lines and each partially severed from its upper edge to its diagonal folding line, upwardly-extending tongues provided on said extensions, and flaps on walls of the box overlying at their ends said extensions and provided with depending portions which extend below those portions of the flaps overlying the extensions and slidingly engage with said tongues, said tongues being constructed and arranged to permit the flaps to be bodily moved upwardly out of the way of the upper edges of the corner-extensions during erecting and collapsing of the box without springing the extension-overlapping ends of the flaps and without disengaging at their depending portions from said tongues.

13. A collapsible box formed of a base, walls extending upwardly therefrom, corner-extensions connected with walls of the box and lying against adjacent box-walls, said extensions being foldable along diagonal folding lines and each partially severed from its upper edge to its diagonal folding line, and flaps carried by walls of the box overlying at their ends said extensions and provided with depending portions which extend below those portions of the flaps overlying the extensions and slidingly engage with the box adjacent to said lines of partial severance, and operating to permit the flaps to be bodily moved upwardly out of the path of movement of the upper edges of the corner-extensions during the erecting and collapsing of the box without springing the extension-overlapping ends of the flaps and without disengaging at their depending portions from the box.

14. A collapsible box formed of a base, walls extending upwardly therefrom, corner-extensions lying against adjacent ends of the box-walls and hingedly connected therewith, said extensions overlapping each other at their inner ends and extending substantially from the upper to the lower edges of said walls to form center braces therefor and foldable along diagonal folding lines and each slit along a line extending at an angle to said base from its upper edge to its diagonal folding line, means for securing said extensions in overlapped condition to the walls against which they lie to afford upwardly-extending tongues, and flaps on walls of the box overlying at their ends said extensions and provided with depending portions which extend below those portions of the flaps overlying the extensions and slidingly engage with said tongues, said tongues being constructed and arranged to permit the flaps to be bodily moved upwardly out of the path of movement of the upper edges of the corner-extensions during the erecting and collapsing of the box, without springing the extension-overlapping ends of the flaps and without disengaging at their depending portions from said tongues.

15. A collapsible box formed of a base, walls extending therefrom, corner-extensions connected with walls of the box to lie against adjacent box-walls and foldable along diagonal folding lines, and flaps on the end-walls of the box overlying, at their laterally-extending ends, said extensions and provided with depending sections which extend below those portions of the flaps overlying the extensions and slidingly engage with the box intermediate those portions of said corner-extensions which are directly connected with the side-walls of the box, said flaps operating to permit the flaps to be bodily moved upwardly out of the way of the upper edges of said corner-extensions during the erecting and collapsing of the box without springing the extension-overlapping ends of the box and without disengaging at their depending sections from the box.

SIEGMUND BACHMANN.

In presence of—
R. A. SCHAEFER,
JOHN WILSON.